May 16, 1967 G. W. SEULEN ETAL 3,320,348
INDUCTION MELTING FURNACE
Filed Aug. 7, 1964 6 Sheets-Sheet 1

INVENTORS
JOHN T. VAUGHAN &
GERHARD W. SEULEN
BY
ATTORNEYS

May 16, 1967 G. W. SEULEN ETAL 3,320,348
INDUCTION MELTING FURNACE
Filed Aug. 7, 1964 6 Sheets-Sheet 4

INVENTORS.
JOHN T. VAUGHAN &
GERHARD W. SEULEN
BY

ATTORNEYS

INVENTORS.
JOHN T. VAUGHAN &
GERHARD W. SEULEN
BY

ATTORNEYS

INVENTORS
JOHN T. VAUGHAN &
GERHARD W. SEULEN
BY
ATTORNEYS

United States Patent Office 3,320,348
Patented May 16, 1967

3,320,348
INDUCTION MELTING FURNACE
Gerhard W. Seulen, Remscheid-Hasten, Germany, and John T. Vaughan, Tampa, Fla., assignors to V & V Companies, Inc., Cleveland, Ohio, a corporation of Ohio
Filed Aug. 7, 1964, Ser. No. 388,116
21 Claims. (Cl. 13—27)

This invention relates generally to the art of induction heating and more particularly to an inductively heated ladle or container for molten metals.

It is common practice in inductively heated ladles or the like of capacities of a ton or more to imbed the induction coil in a refractory lining which in turn is supported inside of a steel outer shell.

This construction has certain disadvantages arising primarily from the imbedded location of the induction coil. Such coils are usually constructed of copper tubing and must be water cooled to prevent them from melting. The water cooled coil tends to cool the refractory lining thus taking heat away from the molten metal charge. Furthermore, when the apparatus is poured or tapped, the refractory lining is rapidly cooled by the coil leading to thermal shock. Also, thermal shock results when molten metal is poured into an empty unit after the refractory lining has been cooled by the continuously circulating water in the induction coil. Aside from these disadvantages, there is a risk of an explosion if the molten metal penetrates a crack in the lining and melts a portion of the coil thus coming into contact with the cooling water. Another factor is the difficulty of repairing the refractory lining. In relining, pneumatic hammers or the like are used to chip out worn or defective refractory and extreme care must be used to avoid possible damage to the coil.

Ideally the induction coil should be mounted on the outside of the steel shell to avoid these problems, but with this solution new difficulties arise. Thus, the steel shell or casing of the apparatus is directly within the strongest part of the magnetic field about the coil and will absorb appreciable amounts of electric energy greatly impairing the heating efficiency. Since refractory materials have a very low tensile strength it would not be practical to simply eliminate the casing because some support is necessary to reinforce the refractory lining.

The present invention contemplates an inductively heated ladle which overcomes all of the above-referred to difficulties and others and provides an inductively heated ladle which is relatively simple in construction, electrically efficient and has a wide variety of applications.

In accordance with the present invention, an inductively heated ladle is provided including a container made of refractory material and having a bottom and side walls defining a space for holding molten metal, a multi-turn inductor coil surrounding the container and adapted to be connected to an alternating current power source and create a magnetic field linking with the molten metal in the container and a plurality of nonmagnetic, metallic, generally vertically extending members inside of the coil spaced around the chamber in supporting relationship to the refractory, such members being so dimensioned relative to the "reference depth" of the magnetic field at the frequency of the power source so as not to absorb an amount of electrical power which will be seriously detrimental to the operation of the apparatus.

By "reference depth" is meant the depth of penetration of a magnetic field in a metallic member, which depth may be defined by the following equation: $d = 3160\sqrt{r/f}$ where $d$ is in inches, $r$ is resistivity of the metal in ohms-inches and $f$ is the frequency in cycles per second. As is apparent, the higher the resistivity, the greater the depth.

Normally, the metallic members are made of a nonmagnetic, stainless steel which has a relatively high resistivity compared to the low carbon or magnetic steels and at 60 cycles per second, the reference depth is approximately 2.2 inches.

Further in accordance with the invention, the members extend upwardly beyond the upper axial end of the coil and are rigidly fastened to a nonmagnetic, metallic ring which is electrically discontinuous at one point and is positioned above the upper axial end of the coil.

Further in accordance with the invention, the members extend axially below the lower end of the coil and are either rigidly joined to a nonmagnetic, metallic member positioned below the lower axial end of the coil or the members below the lower axial end of the coil extend radially inwardly beyond the outer diameter of the chamber and are fastened to a rigid nonmagnetic member.

Further in accordance with the invention, additional reinforcing for the refractory may be provided in the form of nonmagnetic, metallic elements extending laterally between and insulated from the vertically extending members, such elements having a predetermined thickness and at least adjacent the ends of the coil, a predetermined width, the thickness and width being so related to the reference depth that a negligible amount of electrical power will be dissipated in them. Also, in the case where such elements extend circumferentially with respect to the vertically extending members, they are electrically discontinuous at one point in their circumference; or in the case where the elements extend helically, the winding direction is periodically reversed so that the induced voltage between axially spaced points will not be excessive.

Further in accordance with the invention, and particularly in the event the members are fastened to a plate below the lower axial end of the coil, magnetically permeable material is positioned on the upper side of the plate extending preferably from a point radially outside of the coil to a point inwardly beyond the outer diameter of the container, but spaced from the axis of the coil whereby to provide a low impedance path for the flux inwardly to the charge. Also, an electrically discontinuous, nonmagnetic, metal ring of low resistivity is placed below the lower axial end of the coil and above the plate to partially shield the plate from the flux around the coil, such ring having an axial thickness at least equal to the reference depth.

In some instances the container will extend axially upwardly above the coil and will be surrounded by a conventional steel housing and in such event, in accordance with the invention, the steel housing for the refractory portion is circumferentially electrically discontinuous for a substantial vertical height above the coil itself. Also, electrically discontinuous nonmagnetic metal rings of low resistivity having an axial thickness at least equal to the reference depth are positioned above the upper axial end of the coil and below the steel housing to shield such housing from the flux around the coil.

The principal object of the invention is the provision of a new and improved inductively heated ladle for molten metals wherein the inductor coil may be located physically outside of the refractory portion of the ladle and the ladle is strong enough to hold large weights of molten metal.

Another object of the invention is the provision of a new and improved refractory container for molten metals in which the inductor is located externally of the refractory portion and reinforcing means are provided for the refractory portion so arranged as to absorb a minimum or low amounts of the electrical power.

Another object of the invention is the provision of a new and improved inductively heated ladle for holding molten metal wherein the inductor coil is located externally of the refractory portion of the ladle, metallic reinforcing means are provided for the refractory portion including a metallic base plate and magnetically permeable means are provided for carrying the magnetic flux to the molten charge and preventing it from linking with the metal base plate.

Another object of the invention is the provision of a new and improved ladle for holding molten metal comprised of upper and lower refractory portions and having an induction heating coil surrounding the lower portion, the upper portion being surrounded by a steel case and being so arranged as to absorb a minimum amount of electrical energy from the flux field around the coil.

A further object is the provision of means for shielding the upper metallic case and lower metal base plate from the magnetic flux of the induction heating coil.

These and other objects will become apparent through a better understanding of the invention which may be gained by reference to the following description and drawings wherein:

The invention will be described with particular reference to a pouring ladle, although it is not necessarily so limited. Furthermore, the description herein will be confined to a power source having a frequency of 60 cycles per second, but it should be understood that other frequencies consistent with efficient induction melting will serve equally as well inasmuch as the particular operating frequency is not a limitation of the invention.

Referring generally to the drawings wherein the showings are for the purpose of illustrating preferred embodiments of the invention only and not for the purpose of limiting same, the figures show a pouring ladle 10 supported from a bail and trunnion mechanism 11 over a pit 12 and having a filling spout 13 and a pouring spout 14 on opposite sides of the ladle 10 and opening into a main chamber 16 having a lower sump portion 17 which is defined by refractory side and bottom walls 18 and 19. An open framework or cage 20 supports the refractory walls 18, 19 enabling them to withstand the weight of a molten metal charge 22 while a conventional metal casing 24 reinforces the upper refractory portions 26 of the ladle 10. For a more detailed understanding of pouring ladles of the type shown and their operation, reference is made to U.S. Patent 3,058,180 entitled, "Apparatus for Pouring Molten Metal," issued Oct. 16, 1962.

An induction heating coil assembly 28 is mounted in exterior surrounding relationship with respect to the refractory wall 18 and cage 20 and is adapted to be connected to an alternating current power source, generally indicated by the numeral 30, for inductively heating the metal charge 22 situated in the sump 17.

*Casing*

Figures 1, 2, 3, 4, 5:
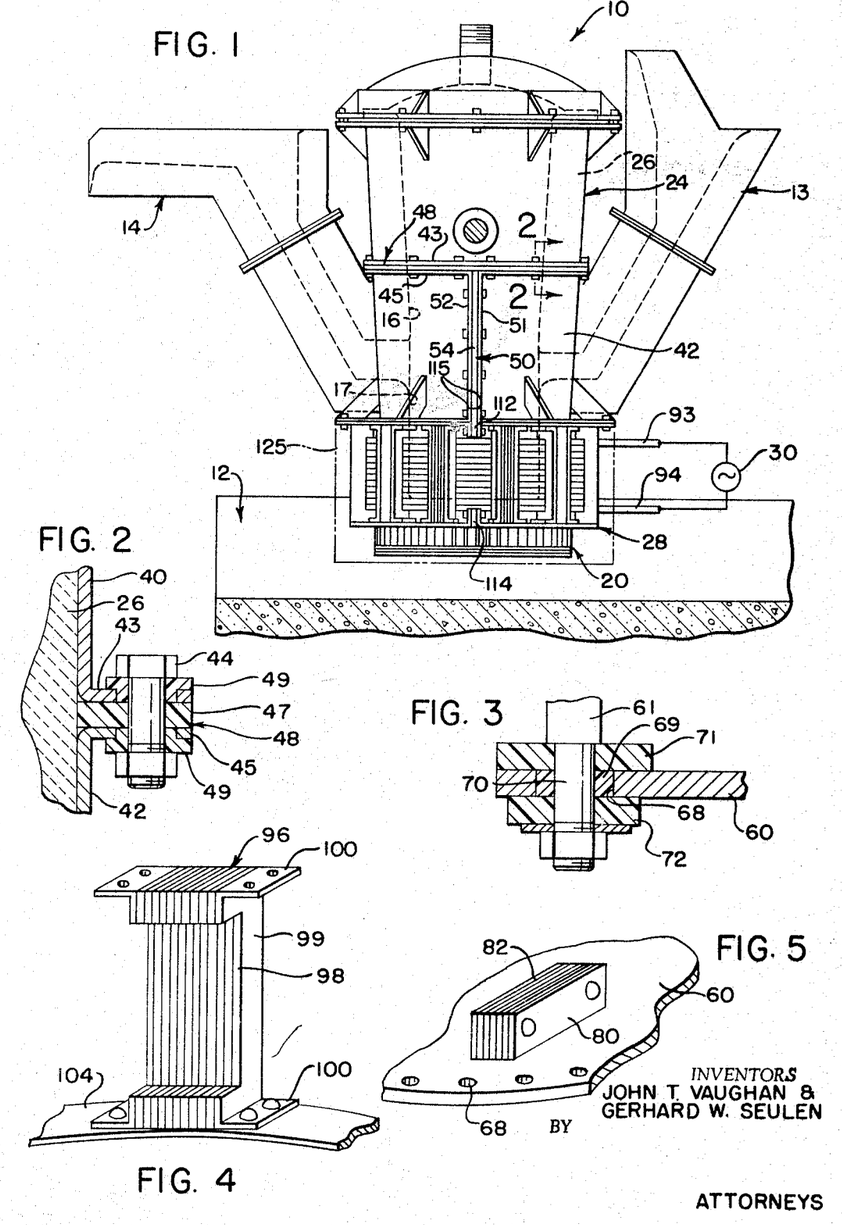
FIGURE 1 is a side elevational view of an inductively heated pouring ladle incorporating the invention.
FIGURE 2 is an enlarged sectional view of a portion of the casing of the ladle shown in FIGURE 1 taken along line 2—2.
FIGURE 3 is an enlarged fragmentary sectional view showing an insulated mounting arrangement taken along line 3—3 of FIGURE 6.
FIGURE 4 is a perspective view of a magnetically permeable assembly taken approximately along line 4—4 of FIGURE 8.
FIGURE 5 is a perspective view of another type of magnetically permeable assembly taken approximately along line 5—5 of FIGURE 9.
Figure 6:
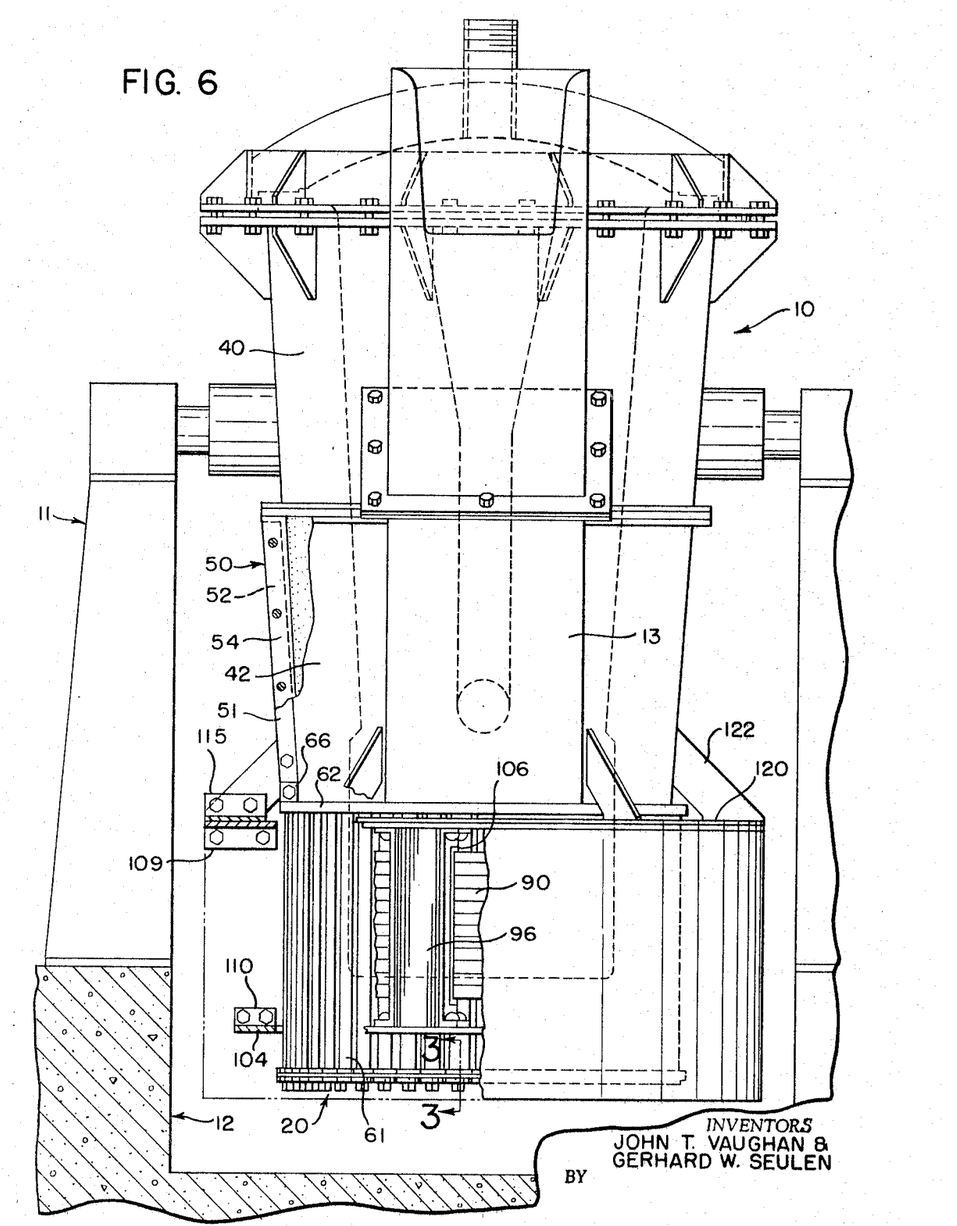
FIGURE 6 is a right side elevation view of the ladle shown in FIGURE 1 with portions of the casing and induction coil assembly broken away to show details of the invention.
Figure 7:
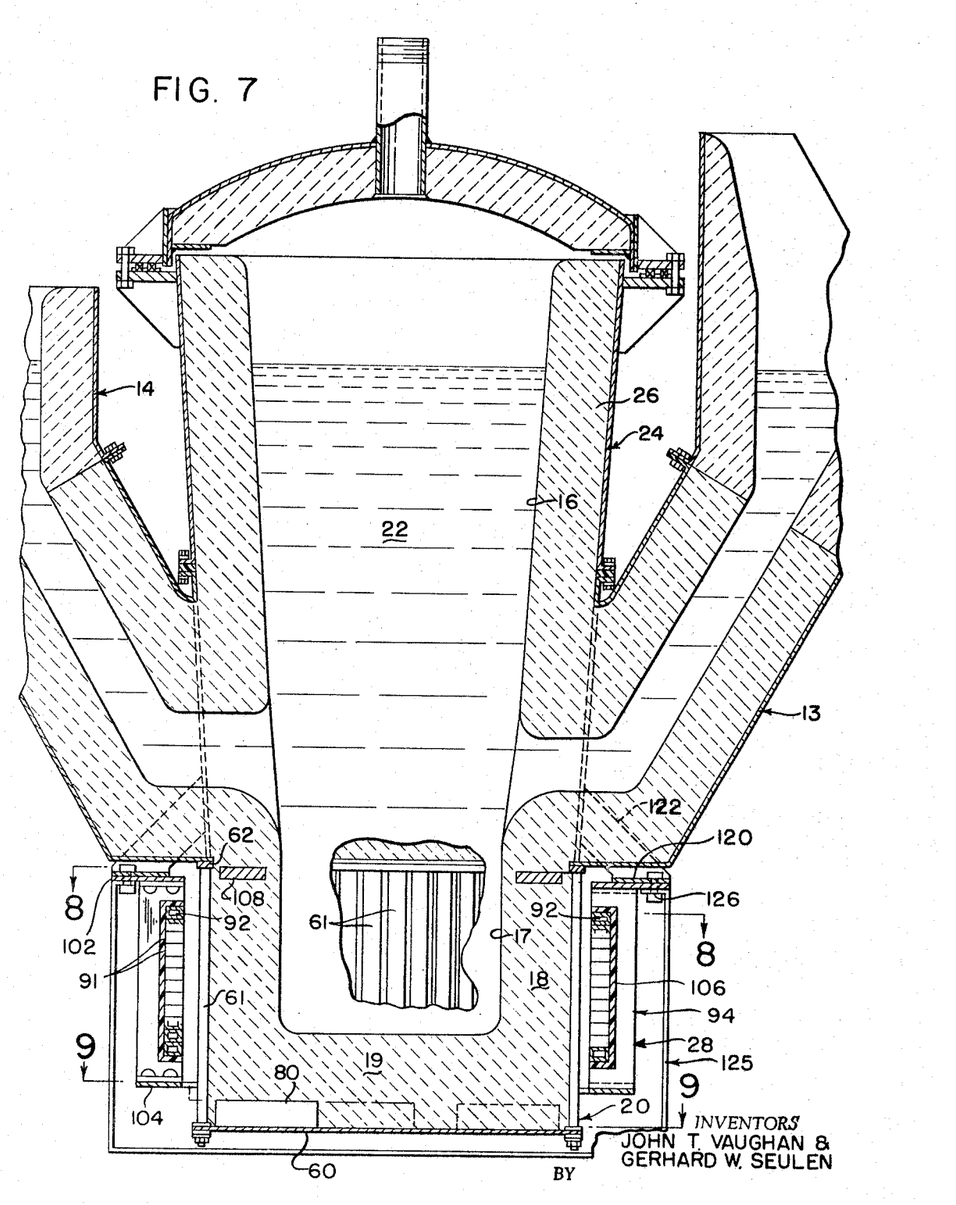
FIGURE 7 is a partial vertical sectional view of the ladle shown in FIGURE 1 with portions of the refractory broken away showing the vertically extending reinforcing members therefor.

With particular reference to FIGURES 1 and 2, the metal casing 24 is normally made of steel plate and has formed around the inside thereof the refractory lining 26 which may be firebrick or a suitable alumina base refractory mix. The casing 24 supports this portion of the lining against the laterally acting fluid pressures of the melt and extends downwardly below the spouts 13 and 14 terminating in a plane slightly above the top of the induction coil assembly 28. The casing 24 is actually in two parts, an upper section 40 and a lower section 42. The upper section 40 has a lower annular flange 43 which is attached by bolts 44, as shown in FIGURE 2, to a mating upper annular flange 45 on the lower section 42. Secured between the flanges 43 and 45 is a ring 47 of a suitable dielectric material forming an electrically insulative circumferential seam between the upper and lower sections 40 and 42. A pair of insulating grommets 49 surround each bolt 44 and insures that no conductive path through the bolts 44 is provided between the two sections 40 and 42. In addition, the lower section 42 has an axially extending split 50 generally parallel to the axis of the induction coil assembly 28 defined by two parallel flanges 51 and 52. A strip 54 of a dielectric material is located between the flanges 51 and 52 which are bolted together in a manner similar to the construction shown in FIGURE 2 whereby the lower section 42 is rendered electrically nonconductive in a circumferential direction for reasons to be explained more fully hereinafter.

*Cage*

Due to the hydrostatic pressure of the molten metal charge 22 and the low tensile strength of presently available refractory materials, it is necessary to reinforce the refractory walls 18, 19 of the sump 17.

Cage 20 provides such reinforcement and, in accordance with the invention, is positioned below the casing 24 in supporting engagement with the refractory material. Referring to FIGURES 6–9, the cage 20 includes a bottom disc 60 and a plurality of circumferentially spaced, vertically extending members or ribs 61 connected to an upper ring 62 which may be welded or otherwise secured to the bottom edge of the casing section 42. The ribs 61 may have any desired cross-sectional shape, e.g., round, or T-shaped, but in the preferred embodiment, have a rectangular cross section and are in closely spaced supporting engagement with the refractory side walls 18. With respect to ladle 10 the ribs 61 extend in a vertical direction during normal operation. However it should be understood that the prime consideration is that they extend generally parallel to the axis of the coil regardless of whether the apparatus employing the invention is in a vertical or tilted position. Each rib 61 is fastened at the top to ring 62 which girds the refractory lining in a plane slightly above the coil assembly 28. The ring 62 preferably has split 64 in its circumference aligned with the dielectric strip 54 in the lower casing section 42. The strip 54 is merely extended below the casing section 42 and the adjacent ends of the ring 62 are joined in an electrically insulated fashion by bolts 63 and flanges 65 and 66 similar to the manner shown in FIGURE 2. Thus, both the casing section 42 and the ring 62 are rendered electrically discontinuous in a circumferential direction.

For reasons to be explained, an important feature of the invention is that the ribs 61 and ring 62 have a predetermined cross-sectional thickness in a generally radial direction which is a factor in reducing power losses and increasing electrical efficiency. In this connection, the ribs 61 and ring 62 are preferably formed of high strength, nonmagnetic metal having a relatively high electrical resistivity, e.g., stainless steel which exhibits a predominantly stable austenitic phase at room temperature.

As shown in FIGURES 3 and 5, the bottom disc 60 has a plurality of circumferentially spaced holes 68 each of which receives a sleeve 69 of dielectric material through which extends a stud 70 on the end of each rib 61. Insulative washers 71 and 72 complete the joint assembly thus electrically insulating the disc 60 from each rib 61. Since the disc 60 is close enough to the coil assembly 28 to be within a portion of the magnetic field, it is preferably formed of a nonmagnetic metal having a low electrical resistivity such as brass or copper. Of course, other metals may also be used, for example, alloys of aluminum.

Also due to the proximity of the coil, a plurality of circumferentially arranged packets 80 of high magnetically permeable material are imbedded in the bottom refractory wall 19 above the disc 60. The packets 80 extend from adjacent the lower end of the coil assembly 28 radially inwardly toward, but spaced from, the center of the ladle and rest on the disc 60 as an integral part of the bottom 19 being rammed in with the refractory lining when it is constructed within the cage 20. Each packet 80 comprises a number of thin metal laminations 82 secured together in a suitable manner and insulated from each other by a dielectric epoxy material. The laminations 82 are made of a high magnetically permeable metal such as silicon steel of the type commonly used for transformer cores. The function of the packets 80 will be discussed in detail hereinafter.

*Coil*

Referring again to FIGURES 6–9, the coil assembly 28 includes an induction coil unit 90 in closely spaced circumferential relationship with the cage 20 being formed of a number of turns of copper tubing 91 insulated with an epoxy coating insulation. A plurality of coil circuits may be provided each with its own water cooling passage, but for purposes of illustration, a continuous multi-turn coil unit 90 having a single cooling circuit 92 is shown. Cooling water may be supplied and returned through suitable coil terminals and jumper cables 93 and 94 which may be adapted to carry the circulating water as well as the alternating current from the power source 30. Surrounding the coil unit 90 is a coil support structure or yoke 94 including a plurality of circumferentially spaced packs 96 of highly magnetically permeable material extending behind and over each end of the coil unit 90 and preferably aligned with the packs 80 in the refractory bottom 19. As shown in FIGURE 4, the packs 96 are formed of a number of channel shaped, thin metal laminations 98 insulated from each other with an epoxy coating material and stacked together between side plates 99 having bosses 100 at each end for mounting each pack 96 between upper and lower rings 102 and 104. The laminations 98 are preferably made of transformer core steel the same as the laminations 82 in the packets 80. The side plates 99 may be made of any nonmagnetic, high conductivity metal such as brass to minimize induced power losses in them. An insulation board 106 between each pack 96 and the coil unit 90 maintains the adjacent coil turns 91 and laminations 98 separated and helps support the coil.

*Magnetic shielding*

Figure 8:
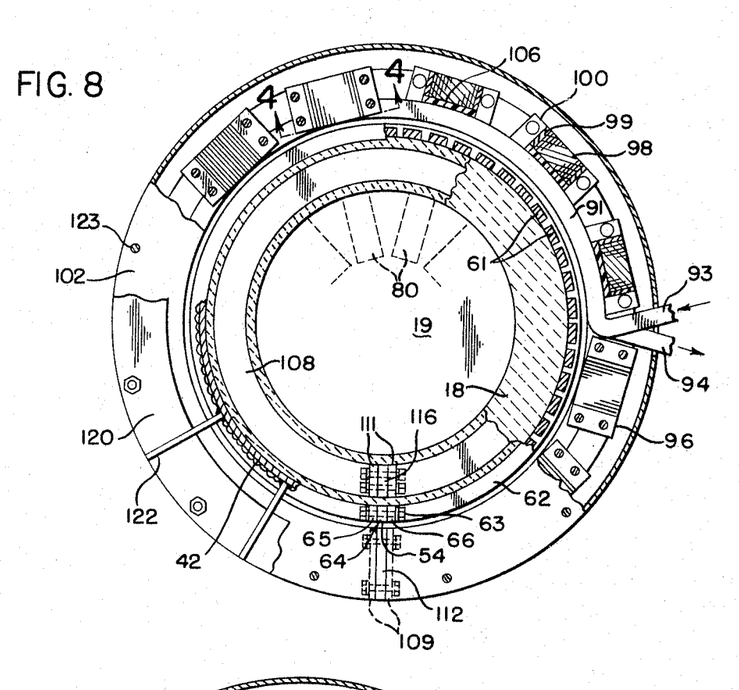
FIGURE 8 is an offset horizontal cross-sectional view through the lower portion of the ladle taken along line 8—8 of FIGURE 7.
Figure 9:
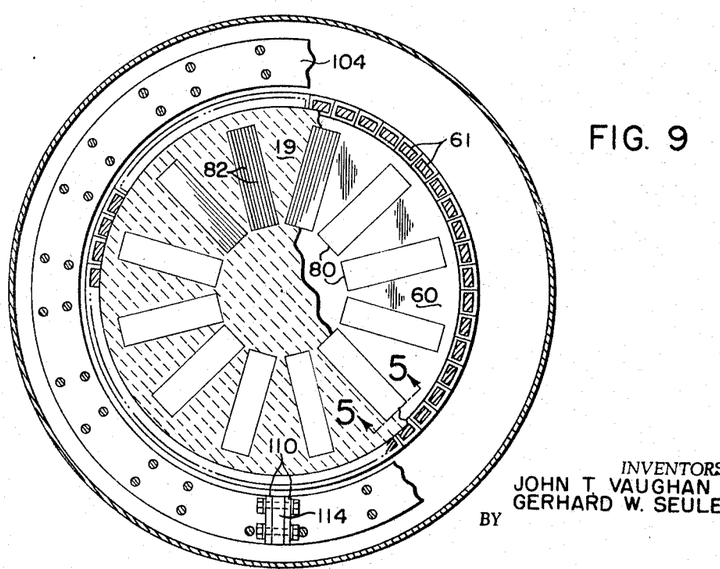
FIGURE 9 is an offset horizontal cross-sectional view taken near the bottom of the ladle along the line 9—9 of FIGURE 7.

As best shown in FIGURE 8, the upper ring 102 is relatively wide and overlays the axial upper end of the coil unit 90 extending horizontally between the coil and the lower casing section 42. As shown in FIGURE 9, the lower ring 104 extends beneath the lower end of the coil unit 90 lying between it and the disc 60. In addition a third ring 108, located radially inwardly and generally in the plane of ring 102, is imbedded in the lining wall 18. The rings 102, 104, and 108 are preferably split at some convenient point on their circumferences and have axially extending bolted flanges 109, 110, and 111 separated by dielectric strips 112, 114, and 116 respectively whereby the rings are made electrically discontinuous in a circumferential direction. While not shown, the rings 102, 104, and 108 may have circumferential water cooling passages if found necessary for cooling purposes. The entire coil assembly 28 is removably supported from a hoop 120 carried by brackets 122 welded to the casing section 42. The upper ring 102 has a dual purpose in this regard since it also serves as a mounting ring for the coil assembly 28 and is provided with openings 123 for receiving suitable mounting bolts for this purpose. The hoop 120 is split at the same point on its circumference as ring 102 and has bolted flanges 115 which are separated by a portion of the dielectric material 112 extending upwardly from the ring 102 whereby the hoop is also electrically discontinuous. A nonmagnetic housing 125 surrounds the coil assembly 28 and has an upper flange 126 which bolts to the hoop 120.

One feature of the invention is that the rings 102, 104, and 108 are made of brass or some other nonmagnetic, high conductivity metal and have a predetermined axial thickness greater than the reference depth for reasons to be explained hereinafter.

*Operation*

This invention is principally concerned with mounting the coil 90 on the outside of the refractory walls 18 and reinforcing the exposed refractory walls 18 and 19 to enable them to withstand the weight of the molten charge 22. In line with this purpose the cage 20 is designed with reference to induction heating principles so as not to unduly impair the heating efficiency of the externally mounted coil 90. When power is turned on to the coil 90, an alternating current flows and all of the space inside of the coil is subjected to a rapidly changing magnetic field. This varying magnetic field links the coil 90 and the portion of the metal charge 22 in the sump inducing a voltage near the outer surface of the charge causing current to flow therein which heats the charge. As may be expected, any other metallic body presenting a conductive path for induced currents which is linked by the varying magnetic field will also be heated to some degree thus constituting an objectionable power loss which could otherwise be used for heating the metal charge.

Turning to a consideration of the cage 20, it is noted that the ribs 61 are circumferentially spaced from each other and extend parallel to the magnetic field generally in alignment with the coil axis so that there is a nonconductive air gap between each rib 61. Circumferential currents cannot flow.

In addition to the geometry of the cage 20, the radial thickness of the ribs 61 is held to a predetermined radial dimension which is primarily a function of the operating frequency of the power source and the electrical resistivity of the nonmagnetic rib metal.

In accordance with the invention, the radial thickness of metal within the magnetic field should not exceed the reference depth as heretofore defined. In the present case, an operating frequency of sixty cycles per second is chosen to illustrate the invention. Also a common nonmagnetic, high strength, high resistivity metal for the ribs 61 is selected such as a wrought stainless steel of the 300 series having an electrical resistivity of approximately $30 \times 10^{-6}$ ohm-inches at 70° F. As a result, a radial thickness on the order of 2.2 inches may be tolerated in the ribs 61 before appreciable inductive losses begin to occur.

It should be noted also that the ribs 61 are insulated from the discs 60 at the bottom as shown in FIGURE 3 so that there is no complete electrical circuit between them and the ring 62 at the top. The ring 62 is also preferably made of nonmagnetic, high resistivity metal such as austenitic stainless steel and has a cross-sectional thickness in a generally radial direction which is less than the reference depth. In addition, the ring 62 is electrically discontinuous at one location on its circumference thus preventing a current flow in a circumferential direction.

Where a metal bottom structure is needed to support the refractory lining which is close enough to the inductor coil to be within its magnetic field, then such a bottom is preferably constructed in the manner of disc 60. The disc 60 is formed of a high conductivity metal such as brass so that any induced power losses are minimized or at least reduced. To further control losses, magnetically permeable packets 80 are used to provide a low impedance path for the flux above the disc 60 from adjacent the coil 90 in toward, but spaced from, the center of the sump 17.

Figures 10, 11:
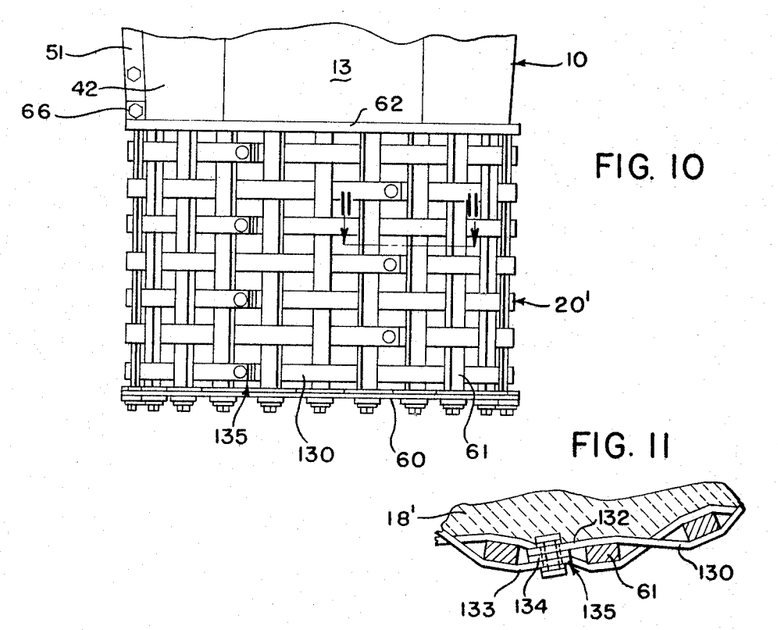
FIGURE 10 is a partial side view of the ladle without the coil assembly and coil housing showing a modification of the invention.
FIGURE 11 is an enlarged fragmentary sectional view of the modification shown in FIGURE 10 taken along line 11—11.
Figure 12:
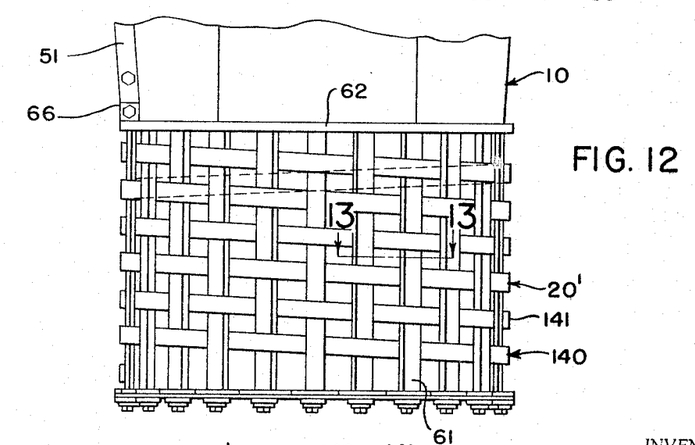
FIGURE 12 is a view similar to FIGURE 10 showing a further modification of the invention.
Figure 13:
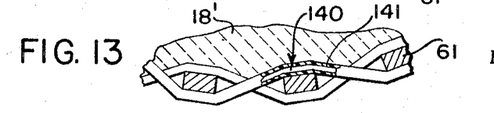
FIGURE 13 is an enlarged fragmentary sectional view of the modification shown in FIGURE 12 taken along line 13—13 showing portions of the insulation broken away.
Figure 14:
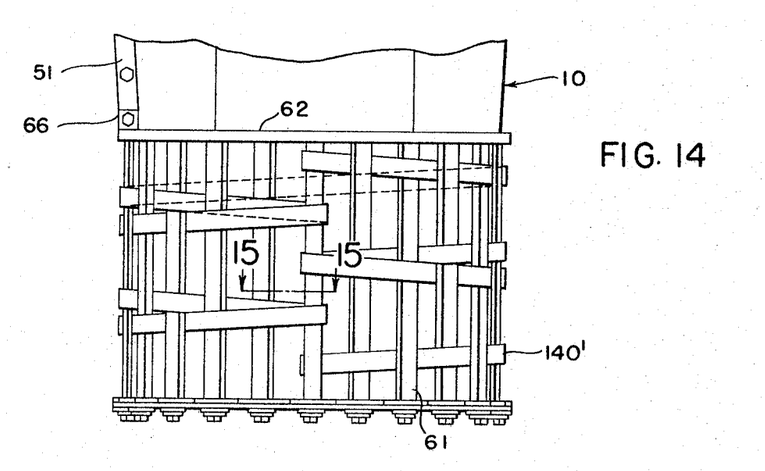
FIGURE 14 is a view similar to FIGURES 10 and 12 showing a further modification of the invention.

Modifications of the basic cage 20 are shown in FIGURES 10, 12, and 14. Only the lower sump portion of the pouring ladle 10 is shown with the induction coil assembly 28, mounting hoop 120 and brackets 122 not illustrated. For simplicity, like parts will be identified with like numerals and similar parts by like numerals with the addition of a prime. As shown in FIGURES 10 and 11, a cage 20' is provided for reinforcing the refractory walls 18' and includes a plurality of circumferentially spaced ribs 61 connected between a bottom disc 60 and an upper ring 62. It should be understood that the description with respect to the basic cage 20 also applies here, that is, the generally radial cross sectional thickness of the ribs 61 and ring 62 are predetermined as being not greater than the reference depth; the ring 62 is electrically discontinuous at one point on its circumference; the ribs 61 are insulated at their lower ends from the disc 60 which is preferably made of high conducting metal; and magnetically permeable material is used to provide a low impedance flux path above the disc 60 similar to the packets 80 shown for example in FIGURE 5. However, in the modification shown in FIGURE 10, additional reinforcement for the refractory side walls 18' is provided in the form of a plurality of laterally extending elements or metal bands 130 which are interwoven between the vertically extending ribs 61 in a circumferential direction as best shown in the fragmentary view in FIGURE 11. Since the bands 130 will extend generally parallel to the induction coil, they must be electrically discontinuous to prevent a secondary induced current from flowing in them. For this reason the adjacent ends 132 and 133 of each band 130 are separated by a dielectric insert 134 forming a nonconductive lap joint 135. Any number of bands 130 may be used, one adjacent the other, depending upon the required reinforcement. Each band 130 is suitably insulated from the ribs 61, for example, by either coating the bands or the rib elements with an epoxy insulation coating where they are in electrical engagement.

To hold down eddy current losses within each band 130, the radial thickness is made less than the reference depth and a nonmagnetic, high resistivity metal such as austenitic stainless steel is used. In addition to having a predetermined radial thickness, at least the bands 130 which will lie above and below the upper and lower axial ends of the induction coil also have a predetermined axial width. These upper and lower bands 130 will be located directly within the path of the magnetic circuit passing over and under the ends of the coil and to reduce the volume of metal capable of affording a conductive path, they should not be wider than approximately three times the reference depth whereby the tendency for axially circulating eddy currents to flow is reduced.

Referring now to FIGURE 12, a further modification is shown wherein a continuous metal strip 140 is interwoven in a circumferential direction between ribs 61 in helical fashion from top to bottom of the cage 20'. As with bands 130, the strip 140 may be coated with an epoxy insulation 141, at least where the strip touches the ribs 61. Each full circle of the strip 140 will represent substantially a parallel secondary turn with respect to the induction coil resulting in an induced voltage between axially spaced turns. There will be no inductive power losses, however, since the ends of the strip 140 are not electrically connected. In the event, the induced voltage between any two axially spaced points on the strip 140 is high enough to cause a dielectric breakdown in the insulation 141 between the strip 140 and the ribs 61, then a construction as shown in FIGURE 14 is preferred.

In this modification, a continuous metal strip 140' is circumferentially interwoven between and insulated from the ribs 61, but in this case the winding direction changes periodically by bringing the end of the strip 140' completely around one of the ribs 61, doubling it back so as to reverse the winding direction, normally after each complete turn. In this way, the induced voltage between any two axially spaced points will not exceed the voltage per turn. A diagram depicting this series bucking relationship between adjacent turns is shown in FIGURE 16.

In order to reduce eddy current losses as much as possible, the continuous strips 140 and 140' are also preferably formed of a nonmagnetic metal, such as stainless steel, and have a radial thickness less than the reference depth. In addition, as with metal bands 130, the strips 140 and 140', at least near the ends of the coil, should not be wider in an axial direction than about three times the reference depth.

Figures 15, 16, 17:
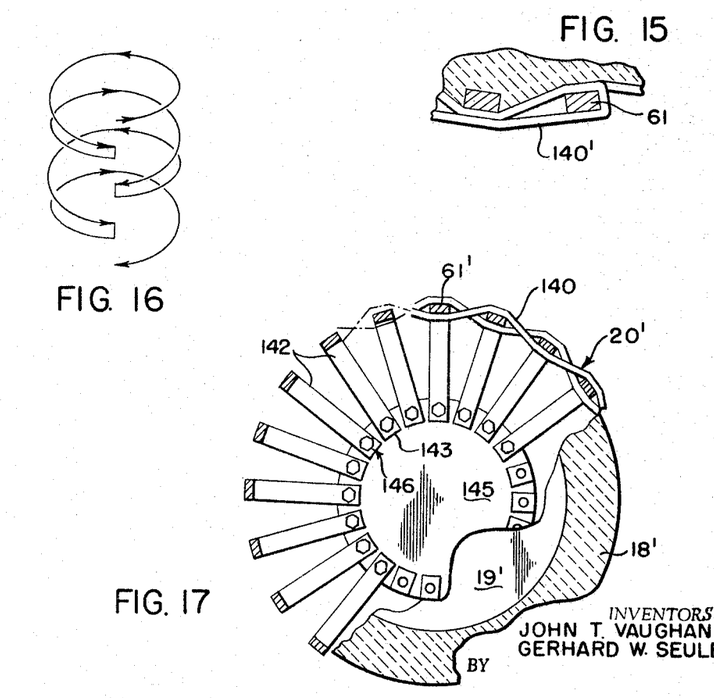
FIGURE 15 is an enlarged fragmentary sectional view taken along line 15—15 of the modification shown in FIGURE 14.
FIGURE 16 is a diagram depicting the voltage relationship between adjacent turns of the circumferentially extending elements shown in FIGURE 14.
FIGURE 17 is a horizontal cross-sectional view above the bottom of the ladle with portions of the refractory broken away showing a further modification of the invention.

A further modification of the cage 20' is shown in FIGURE 17. Here a bottom disc such as disc 60 is eliminated and instead the lower ends of ribs 61' are turned radially inwardly providing spoke portions 142 which extend in a common plane below the refractory bottom 19' in supporting engagement therewith. The radially inner ends 143 of the spoke portions 142 are connected to the periphery of a nonmagnetic, metal plate 145 by means of electrically insulative joints generally indicated by the numeral 146. In this modification, induced currents in the bottom of the cage structure are practically eliminated since the area of metal providing a complete circuit in a circumferential direction has been reduced to the size of central plate 145. As a result, magnetically permeable material such as packets 80 may be eliminated in this construction.

In an induction melting apparatus such as the pouring ladle shown, there is usually a conventional metal superstructure which supports the upper portion of the refractory lining. Accordingly, a further aspect of the invention is to reduce the power losses due to the proximity of such a metal casing to an externally mounted induction coil. With this objective, and as mentioned heretofore, the yoke 94 comprises packs 96 of magnetically permeable lamination 98 which are preferably aligned with the high magnetically permeable lamination 82 in the packets 80 imbedded in refractory bottom 19. Thus, the laminations 82 and 98 together provide a low impedance path for the flux which extends from over the upper axial end of the coil 90, behind and radially inwardly below the lower axial end and above the bottom disc 60. Hence this portion of the flux is confined as closely as possible inwardly toward the sump 17 and away from the surrounding ladle structure such as housing 125 and disc 60. However, some flux strays or fringes into the immediately adjacent portions of the casing 24 and the bottom disc 60. For this reason magnetic shielding in the form of high conductivity metal rings 102, 104, and 108 is provided. Rings 102 and 108 lie in substantially a common plane above the upper axial end of the coil 90 while ring 104 extends beneath the lower axial end of the coil, each ring having an axial thickness equal to or greater than the reference depth and where the rings are made of brass, this dimension is substantially less than 0.5 inch at 60 cycles per second. The rings 102, 104, and 108 lie directly in the path of the fringing flux extending above and below the axial ends of the coil 90 and partially shield the lower portion of casing 24 and bottom disc 60. Even with this magnetic shielding however, a portion of the flux reaches the ladle casing 24 and disc 60. For this reason it is preferable to form the bottom disc 60 of a nonmagnetic, high conductivity metal such as brass so that any induced currents developed therein will cause relatively little power loss; or the bottom may be constructed as shown in FIGURE 17 to minimize the currents initially capable of being induced therein.

To keep down power losses in the casing 24, it is formed in two sections with the lower section 42 insulated from the upper section 40 and having a nonconductive seam 50 therein which extends generally parallel to the axis of the coil 90. Thus the electrically separated section 42 is also electrically discontinuous in a circumferential direction thereby greatly reducing the power loss which would otherwise occur if the casing extended downwardly in uninterrupted fashion.

Having thus described the preferred embodiments of the invention, it will be clear to those having skill in the art that various features may be eliminated, or combined in a different fashion as dictated by the particular application to which the invention is applied. For example, with a coreless induction furnace, there may be no need to provide magnetic shielding if there is no metallic furnace superstructure. Hence, obvious changes may be made without departing from the invention as defined in the appended claims.

Having thus described our invention, we claim:

1. In apparatus of the general type described comprising in combination a container formed of a refractory material and having a bottom and side walls defining a chamber adapted to receive molten metal, a multi-turn induction coil surrounding said side walls and adapted to be connected to a source of alternating current of known frequency and rib means including a plurality of nonmagnetic, metallic, vertically extending rib members arranged in circumferentially spaced relationship inside of said coil and in physically supporting relationship to said refractory material, the number and spacing of said rib members providing a total supported refractory area sufficient to enable the unsupported refractory area to withstand the static, molten metal pressure per unit area from within said container and the thickness of each said rib member through which the magnetic flux must pass being less than the reference depth at the frequency of said power source.

2. The apparatus of claim 1 wherein said rib members extend above said coil and are rigidly joined to an electrically discontinuous ring of non-magnetic material.

3. The apparatus of claim 1 wherein said rib members extend axially below the lower end of said coil and are rigidly connected to a plate of nonmagnetic material positioned below the lower end of said coil.

4. The improvement of claim 1 wherein said rib members extend below the lower axial end of said coil and then extend radially inwardly beyond the inner wall of the chamber and are rigidly connected to a nonmagnetic member.

5. The apparatus of claim 1 wherein said rib members extend below the lower end of said coil and are rigidly fastened to a plate of nonmagnetic material positioned below the lower axial end of said coil and magnetically permeable material positioned above said plate and extending radially to a point beyond the inner wall of said chamber.

6. In an inductively heated radial ladle for molten metals comprised of a container of refractory material having a bottom and side walls defining a chamber to receive molten metal, a multi-turn coil externally of and surrounding said side walls and adapted to be connected to a source of a known frequency, the improvement which comprises: ribbed means for physically reinforcing said refractory side walls including a plurality of nonmagnetic, vertically extending rib members arranged in circumferentially spaced relationship inside of said coil and in physically supporting relationship to said side walls and extending above and below the axial ends of said coil, the number and spacing of said rib members providing a total supported refractory area sufficient to enable the unsupported refractory area to withstand the static, molten metal pressure per unit area from within said container and each said rib member having a maximum thickness through which the magnetic flux must pass not greater than the reference depth at the frequency of said power source and being formed of a material having a known resistivity.

7. The improvement of claim 6 wherein said frequency is 60 cycles per second, said material is stainless steel and the radial dimension is not greater than 2.2 inches.

8. The improvement of claim 6 wherein the upper axial ends of said rib members are rigidly connected to an electrically discontinuous ring of nonmagnetic, high resistivity material positioned above the axial end of said coil.

9. The improvement of claim 6 wherein said rib members extend axially below the lower end of said coil and are rigidly connected to a plate of nonmagnetic, low resistivity material.

10. The improvement of claim 6 wherein magnetically permeable material is positioned between the bottom of said chamber and said plate and extends radially from a point spaced from but close to the axis of said chamber to a point at least adjacent to said coil.

11. The improvement of claim 6 wherein said rib members extend axially below the lower end of said coil and then extend radially inwardly to a point inwardly of the vertical wall defining said chamber and are rigidly connected to a metallic member.

12. The improvement of claim 6 wherein said ribbed means includes in addition, circumferentially extending elements engaging said vertically extending rib members to further reinforce said refractory side walls, said elements being formed of a nonmagnetic material having a known resistivity and having a maximum radial dimension which is not greater than the reference depth at the frequency of the power source.

13. The improvement of claim 12 wherein said circumferentially extending elements extend into areas above and below the axial upper and lower ends of said coils and in said areas are further characterized by having a maximum axial dimension which is not greater than approximately three times the reference depth.

14. The improvement of claim 12 wherein said circumferentially extending elements each comprises a nonmagnetic, metal band electrically insulated from said vertically extending rib members and being electrically discontinuous in a circumferential direction.

15. The improvement of claim 12 wherein said elements extend in a circumferential direction and are arranged in a helical pattern extending generally parallel to said coil.

16. The improvement of claim 15 wherein said elements are comprised of a nonmagnetic metal strip electrically insulated from said vertically extending rib members, said strip reversing winding direction periodically throughout said helical pattern.

17. In an induction heating apparatus, an elongated annular vessel having refractory side and bottom walls defining a main chamber and a lower sump for holding a molten metal charge, a multi-turn coil located externally of the refractory walls and encircling the sump adapted to be connected to an alternating current power source of known frequency, and a metal casing supporting the refractory side walls adjacent the main chamber and extending downwardly to a plane above said coil leaving the lower refractory walls exposed, the improvement comprising: means for electrically isolating a cylindrical portion of said metal casing directly above the upper axial end of said coil and for rendering said portion electrically discontinuous in a generally circumferential direction and reinforcing means physically supporting said exposed lower refractory walls including a nonmagnetic, metal bottom member supportingly engaging the refractory bottom wall and a plurality of circumferentially spaced rib members rigidly connected to said bottom member and extending between it and the electrically discontinuous portion of said metal casing and in physically supporting relationship to said lower refractory walls, the number and spacing of said rib members providing a total supported refractory area sufficient to enable the unsupported refractory area to withstand the static, molten metal pressure per unit area in said sump and each said rib member having a maximum thickness through which the magnetic flux must pass not greater than the reference depth at the known frequency of the power source and being formed of a nonmagnetic metal having a known resistivity.

18. The improvement of claim 17 comprising in addition magnetically permeable means imbedded in said refractory bottom wall above said bottom member and extending from adjacent the lower axial end of said coil radially inwardly toward, but spaced from the coil axis and other magnetically permeable means circumferentially spaced in surrounding relationship to said coil and extending vertically behind the coil and radially inwardly above and below the upper and lower axial ends thereof, said magnetically permeable means being in general radial alignment with each other.

19. The improvement of claim 18 comprising in addition a nonmagnetic, low resistivity metallic material located in the magnetic field around the coil and extending circumferentially over an axial end of said coil, said material having a minimum axial thickness equal to or greater than the reference depth of the magnetic field at the frequency of the power source.

20. The improvement of claim 19 wherein said material is located in a plane between the upper axial end of the coil and the lower axial end of the metal casing.

21. The improvement of claim 20 wherein said material is a flat ring imbedded in said refractory side walls.

References Cited by the Examiner

UNITED STATES PATENTS

| 2,969,411 | 1/1961 | Gibbs | 13—27 |
| 3,058,180 | 10/1962 | Port et al. | 22—79 |
| 3,162,710 | 12/1964 | Anderson | 13—27 |
| 3,177,282 | 4/1965 | Kasper et al. | 13—27 |
| 3,223,519 | 12/1965 | Schippereit | 13—27 |

FOREIGN PATENTS 937,213   9/1963   Great Britain.

RICHARD M. WOOD, *Primary Examiner.*

L. H. BENDER, *Assistant Examiner.*